(12) United States Patent
Chandhok et al.

(10) Patent No.: US 7,912,457 B2
(45) Date of Patent: Mar. 22, 2011

(54) METHODS AND APPARATUS FOR CREATION AND TRANSPORT OF MULTIMEDIA CONTENT FLOWS

(75) Inventors: Ravinder Paul (Rob) Chandhok, Poway, CA (US); Nileshkumar J. Parekh, San Diego, CA (US); Ranganathan Krishnan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 804 days.

(21) Appl. No.: 11/111,050

(22) Filed: Apr. 20, 2005

(65) Prior Publication Data

US 2006/0209694 A1  Sep. 21, 2006

Related U.S. Application Data

(60) Provisional application No. 60/564,467, filed on Apr. 21, 2004.

(51) Int. Cl.
*H04L 29/06* (2006.01)

(52) U.S. Cl. ........... 455/414.3; 455/414.2; 455/3.06; 455/466; 455/412.1; 455/458; 705/14.61; 705/14.68; 709/206

(58) Field of Classification Search .... 455/412.1–412.2, 455/466, 3.05, 414.1–414.3; 370/235, 338, 370/352; 340/7.22; 709/206; 705/14.67–14.68
See application file for complete search history.

(56) References Cited

U.S. PATENT DOCUMENTS

| | | | |
|---|---|---|---|
| 5,552,833 A | 9/1996 | Henmi et al. | |
| 5,600,573 A | 2/1997 | Hendrick | |
| 5,630,119 A | 5/1997 | Aristides et al. | |
| 5,635,918 A * | 6/1997 | Tett | 340/7.29 |
| 5,657,072 A | 8/1997 | Aristides et al. | |
| 5,666,645 A | 9/1997 | Thomas et al. | |
| 5,742,905 A * | 4/1998 | Pepe et al. | 455/461 |
| 5,852,717 A | 12/1998 | Bhide et al. | |
| 5,878,351 A * | 3/1999 | Alanara et al. | 455/466 |
| 6,035,304 A | 3/2000 | Machida et al. | |
| 6,075,526 A | 6/2000 | Rothmuller | |
| 6,091,961 A * | 7/2000 | Khalil | 455/466 |

(Continued)

FOREIGN PATENT DOCUMENTS

EP   1341366   9/2003

(Continued)

OTHER PUBLICATIONS

International Search Report—International Search Authority—European Patent Office PCT/US05/014113 Jul. 8, 2005.

(Continued)

*Primary Examiner* — Sharad Rampuria
(74) *Attorney, Agent, or Firm* — Abdollah Katbab; Gerald P. Joyce, III (57) ABSTRACT

System for creation and transport of multimedia content flows. The system includes a method for transporting a content flow to a wireless access network for broadcast to devices coupled to the wireless access network. The method includes transmitting a request message to add the content flow to the wireless access network, wherein the request message includes a scheduled delivery time. The method also includes receiving a response message indicating that the content flow will be added to the wireless access network, waiting until the scheduled delivery time, and delivering the content flow to the wireless access network.

62 Claims, 6 Drawing Sheets

U.S. PATENT DOCUMENTS

| | | | |
|---|---|---|---|
| 6,223,210 B1 | 4/2001 | Hickey | 709/203 |
| 6,536,041 B1 | 3/2003 | Knudson et al. | |
| 6,580,916 B1* | 6/2003 | Weisshaar et al. | 455/456.1 |
| 6,625,460 B1* | 9/2003 | Patil | 455/466 |
| 6,728,530 B1* | 4/2004 | Heinonen et al. | 455/414.1 |
| 6,961,560 B2* | 11/2005 | Hermann et al. | 455/414.1 |
| 6,963,725 B2* | 11/2005 | Kato | 455/3.04 |
| 6,965,770 B2 | 11/2005 | Walsh | |
| 6,996,393 B2 | 2/2006 | Pyhalammi | |
| 7,073,244 B2 | 7/2006 | Olari | |
| 7,076,244 B2 | 7/2006 | Lazaridis | |
| 7,168,078 B2 | 1/2007 | Bar | |
| 7,248,860 B2* | 7/2007 | Kamdar et al. | 455/414.1 |
| 7,302,057 B2 | 11/2007 | Rotholtz | |
| 7,392,039 B2* | 6/2008 | Souissi et al. | 455/412.2 |
| 7,411,868 B2 | 8/2008 | Kohmoto | |
| 7,415,281 B2* | 8/2008 | Ahn | 455/466 |
| 7,472,075 B2* | 12/2008 | Odinak et al. | 705/26 |
| 7,536,447 B1* | 5/2009 | O'Neil | 709/217 |
| 7,546,383 B2 | 6/2009 | Smith | |
| 2002/0035607 A1* | 3/2002 | Checkoway et al. | 709/206 |
| 2002/0068558 A1 | 6/2002 | Janik | 455/422 |
| 2002/0090932 A1* | 7/2002 | Bhatia et al. | 455/412 |
| 2002/0135698 A1 | 9/2002 | Shinohara | |
| 2002/0143976 A1 | 10/2002 | Barker et al. | |
| 2003/0009770 A1* | 1/2003 | Tantawy et al. | 725/133 |
| 2003/0018794 A1* | 1/2003 | Zhang et al. | 709/231 |
| 2003/0026231 A1* | 2/2003 | Lazaridis et al. | 370/338 |
| 2003/0032409 A1* | 2/2003 | Hutcheson et al. | 455/414 |
| 2003/0045273 A1* | 3/2003 | Pyhalammi et al. | 455/412 |
| 2003/0050058 A1 | 3/2003 | Walsh et al. | 455/426 |
| 2003/0084108 A1* | 5/2003 | Syed | 709/206 |
| 2003/0093530 A1* | 5/2003 | Syed | 709/226 |
| 2004/0045029 A1 | 3/2004 | Matsuura | |
| 2004/0083287 A1 | 4/2004 | Gao et al. | |
| 2004/0133467 A1* | 7/2004 | Siler | 705/14 |
| 2004/0215811 A1 | 10/2004 | Bar | |
| 2004/0230664 A1 | 11/2004 | Bowers et al. | |
| 2005/0022237 A1 | 1/2005 | Nomura | |
| 2006/0159069 A1* | 7/2006 | Parekh et al. | 370/352 |
| 2007/0214482 A1 | 9/2007 | Nguyen | |

FOREIGN PATENT DOCUMENTS

| | | |
|---|---|---|
| JP | 56110372 | 9/1981 |
| JP | 445632 | 2/1992 |
| JP | 2000115165 A | 4/2000 |
| JP | 2001211431 A | 8/2001 |
| JP | 2001275055 A | 10/2001 |
| JP | 2002112155 A | 4/2002 |
| JP | 2002305773 | 10/2002 |
| JP | 2002314546 | 10/2002 |
| JP | 2003108457 | 4/2003 |
| KR | 2003-0022838 | 3/2003 |
| WO | 9822886 | 5/1998 |
| WO | 0056067 | 9/2000 |
| WO | WO 00/64177 | 10/2000 |
| WO | WO 00/69101 | 11/2000 |
| WO | 0074322 | 12/2000 |
| WO | WO01015444 | 3/2001 |
| WO | 02084454 | 10/2002 |
| WO | 03019861 | 3/2003 |
| WO | 03071803 | 8/2003 |
| WO | WO2005107216 | 11/2005 |

OTHER PUBLICATIONS

International Search Report—International Search Authority—European Patent Office PCT/US05/044814.

Written Opinion—PCT/US05/014113—International Search Authority—European Patent Office—Jul. 8, 2005.

International Preliminary Report on Patentabiliy—PCT/US2005/014113, International Preliminary Examination Authority—Alexandria, Virginia, US—Jun. 4, 2007.

3GPP TS 23.246 v6.2.0 (Mar. 2004), "3rd Generation Partnership Project; Technical Specification Group Services and System Aspects; Multimedia Broadcast/Multicast Service (MBMS); Architecture and functional description (Release 6)".

International Preliminary Report on Patentability-PCT/US2005/026268, International Preliminary Examination Authority-Alexandria, Virginia, US- Sep. 14, 2007.

International Preliminary Report on Patentability-PCT/US2005/044814, International Bureau of WIPO, Geneva, Switzerland- Jun. 13, 2007.

International Search Report-PCT/US2005/026268, International Search Authority.

European Patent Office- Nov. 29, 2005.

Written Opinion of the International Preliminary Examining Authority-PCT/US2005/026268, International Preliminary Examination Authority-Alexandria, Virginia, US- May 21, 2007.

Written Opinion-PCT/US05/044814, International Search Authority-European Patent Office- May 16, 2006.

\* cited by examiner

| Message | Function |
|---|---|
| 302 — AddFlowRequest() | Sent by CS to BBS to add a content flow |
| 304 — AddFlowResponse() | Sent by BSS to CS with result of AddFlowRequest message |
| 306 — ModifyFlowRequest() | Sent by CS to BBS to modify parameters of a provisioned flow |
| 308 — ModifyFlowResponse() | Sent by BBS to CS with result of ModifyFlowRequest message |
| 310 — RemoveFlowRequest() | Sent by CS to BBS to remove a content flow |
| 312 — RemoveFlowResponse() | Sent by BBS to CS with result of the RemoveFlowRequest message |
| 314 — RegistrationReportRequest() | Sent by CS to BBS to request registration count |
| 316 — RegistrationReportResponse() | Sent by BBS to CS to report number of registrations |
| 318 — StatisticsCheckRequest() | Sent by CS to BBS to check status of a flow |
| 320 — StatisticsCheckResponse() | Sent by BBS to the CS with the result of the StatisticCheckRequest message |
| 322 — LatencyCheckRequest() | Sent by CS to BBS to get an estimatet of the latency to transmit a flow |
| 324 — LatencyCheckResponse() | Sent by BBS to CS to report transmission latency |

METHODS AND APPARATUS FOR CREATION AND TRANSPORT OF MULTIMEDIA CONTENT FLOWS

CLAIM OF PRIORITY UNDER 35 U.S.C. §119

The present Application for patent claims priority to Provisional Application No. 60/564,467 entitled "METHOD AND APPARATUS FOR CREATION OF MULTIMEDIA CONTENT FLOWS AND TRANSPORT OF MULTIMEDIA" filed Apr. 21, 2004, and assigned to the assignee hereof and hereby expressly incorporated by reference herein for all purposes.

BACKGROUND

1. Field

The present invention relates generally to transporting multimedia content in a data network, and more particularly to a system for creation and transport of multimedia content flows across data networks.

2. Background

Data networks, such as wireless communication networks, have to trade off between services customized for a single terminal and services provided to a large number of terminals. For example, the distribution of content to a large number of mobile terminals (subscribers) is a complicated problem. This is especially true for mobile terminals that communicate using relatively slow speed over-the-air communication links. Therefore, it is very important for content providers to have a way that allows mobile terminals to easily and efficiently receive content and/or other network services.

In current content delivery/media distribution systems, a content provider provides content in the form of audio, video, multimedia, real-time, or non real-time content and other content types to a content provider network that operates to distribute the content to end users. For example, the content provider may provide high quality content, which has corresponding high data rates, to the content provider network. In certain geographic regions, specialized broadcast networks have been developed to receive and distribute this high quality content to selected end users by utilizing special hardware and/or communication links. In some cases, the specialized broadcast network may provide ten or more high bandwidth channels with which to distribute the content.

Unfortunately, these specialized networks are generally expensive and are provided over only limited operating regions. Over wide operating areas wireless access networks typically provide users with much less bandwidth at a much lower cost. For example, a typical wireless network may provide only one data channel with which to deliver multimedia content. Typically, this data channel provides only point-to-point communications so that it is expensive and inefficient to deliver content to a large number of wireless users. Additionally, the bandwidth available on the data channel may be much less than the bandwidth available over the specialized broadcast network. As a result, there currently exists no cost effective and efficient way to deliver high quality content available on a content distribution network to a large number of users on a wireless access network.

Therefore, what is needed is a system to create and transport multimedia content flows across data networks. For example, the system should operate to create and transport multimedia content flows from a content provider's network to a radio access network. The system should also operate to account for bandwidth differences between the two networks.

SUMMARY

In one or more embodiments, a transport system is provided that operates to create and transport multimedia content flows across data networks. For example, in one embodiment, the transport system operates to transport content flows from a content provider network to a wireless access network. By allowing content to be transported to a wireless access network, the content may be broadcast to devices on the network using the limited bandwidth available. Devices that are authorized to receive the content can store the received broadcast in a cache for later viewing.

In one embodiment, a method is provided for transporting a content flow to a wireless access network for broadcast to devices coupled to the wireless access network. The method comprises transmitting a request message to add the content flow to the wireless access network, wherein the request message includes a scheduled delivery time. The method also comprises receiving a response message indicating that the content flow will be added to the wireless access network, waiting until the scheduled delivery time, and delivering the content flow to the wireless access network.

In one embodiment, apparatus is provided for transporting a content flow to a wireless access network for broadcast to devices coupled to the wireless access network. The apparatus comprises transmitting logic that operates to transmit a request message to add the content flow to the wireless access network, wherein the request message includes a scheduled delivery time. The apparatus also comprises receiving logic that operates to receive a response message indicating that the content flow will be added to the wireless access network, waiting logic that operates to wait until the scheduled delivery time, and a bearer channel that operates to deliver the content flow to the wireless access network.

In one embodiment, apparatus is provided for transporting a content flow to a wireless access network for broadcast to devices coupled to the wireless access network. The apparatus comprises means for transmitting a request message to add the content flow to the wireless access network, wherein the request message includes a scheduled delivery time. The apparatus also comprises means for receiving a response message indicating that the content flow will be added to the wireless access network, means for waiting until the scheduled delivery time, and means for delivering the content flow to the wireless access network.

In one embodiment, a computer-readable media is provided that comprises instructions, which when executed by processing logic, operate to transport a content flow to a wireless access network for broadcast to devices coupled to the wireless access network. The computer-readable media comprises instructions for transmitting a request message to add the content flow to the wireless access network, wherein the request message includes a scheduled delivery time. The computer-readable media also comprises instructions for receiving a response message indicating that the content flow will be added to the wireless access network, instructions for waiting until the scheduled delivery time, and instructions for delivering the content flow to the wireless access network.

In one embodiment, a method is provided for transporting a content flow to a wireless access network for broadcast to devices coupled to the wireless access network. The method comprises receiving a request message to add the content flow to the wireless access network, wherein the request message includes a scheduled delivery time. The method also comprises transmitting a response message indicating that the content flow will be added to the wireless access network, and receiving the content flow at the scheduled delivery time for broadcast to the devices.

In one embodiment, apparatus is provided for transporting a content flow to a wireless access network for broadcast to devices coupled to the wireless access network. The apparatus comprises receiving logic that operates to receive a request message to add the content flow to the wireless access network, wherein the request message includes a scheduled delivery time. The apparatus also comprises transmitting logic that operates to transmit a response message indicating that the content flow will be added to the wireless access network, and content receiving logic that operates to receive the content flow for broadcast to the devices.

In one embodiment, apparatus is provided for transporting a content flow to a wireless access network for broadcast to devices coupled to the wireless access network. The apparatus comprises means for receiving a request message to add the content flow to the wireless access network, wherein the request message includes a scheduled delivery time. The apparatus also comprises means for transmitting a response message indicating that the content flow will be added to the wireless access network, and means for receiving the content flow at the scheduled delivery time for broadcast to the devices.

In one embodiment, a computer-readable media is provided that comprises instructions, which when executed by processing logic, operate to transport a content flow to a wireless access network for broadcast to devices coupled to the wireless access network. The computer-readable media comprising instructions for receiving a request message to add the content flow to the wireless access network, wherein the request message includes a scheduled delivery time. The computer-readable media also comprises instructions for transmitting a response message indicating that the content flow will be added to the wireless access network, and instructions for receiving the content flow at the scheduled delivery time for broadcast to the devices Other aspects, advantages, and features of the present invention will become apparent after review of the hereinafter set forth Brief Description of the Drawings, Detailed Description, and the Claims.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

In one or more embodiments, a transport system is provided for the creation and transport of multimedia content flows across data networks.

Figure 1:
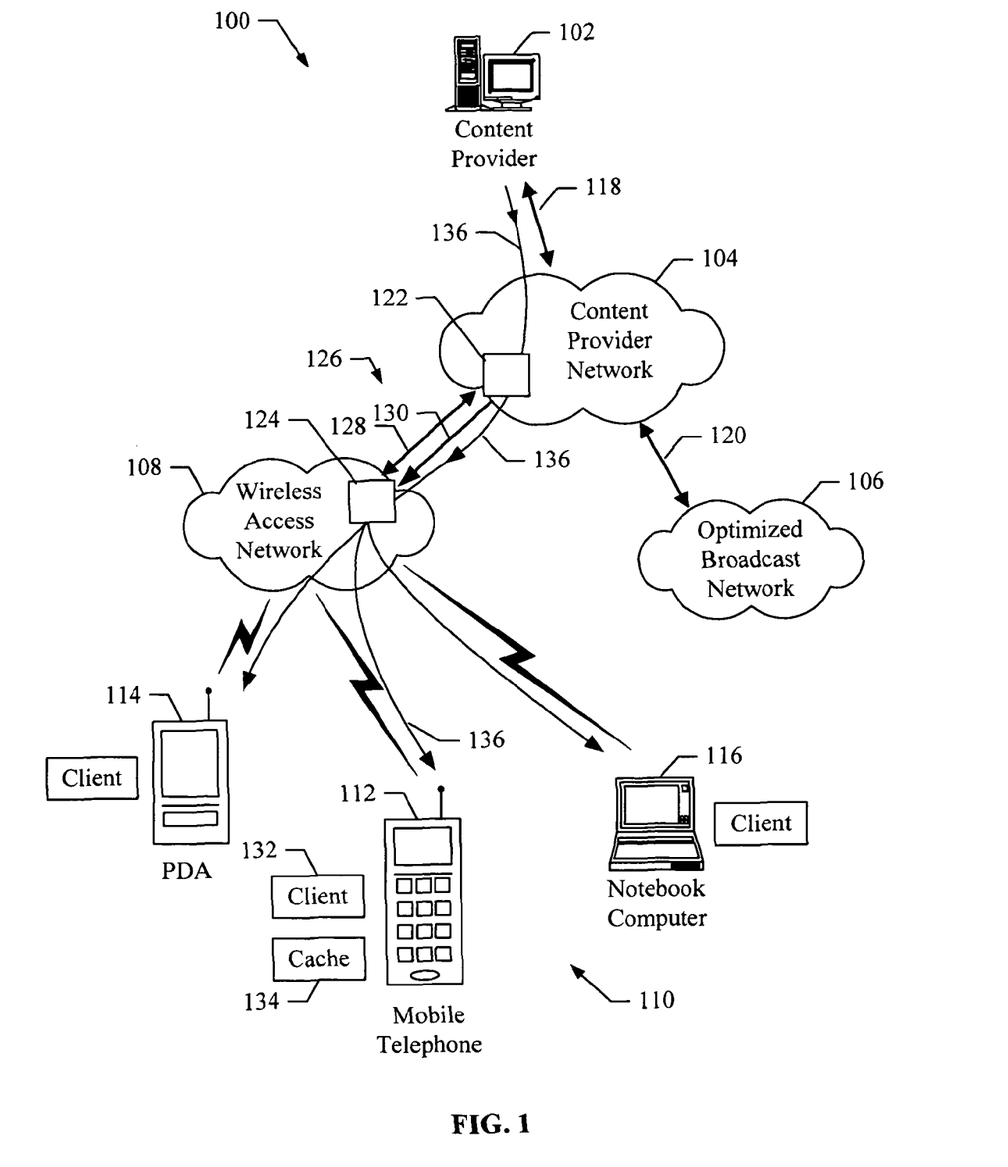
FIG. 1 shows one embodiment of a communication network that comprises one embodiment of a system that operates to create and transport multimedia content flows across data networks.

FIG. 1 shows one embodiment of a communication network 100 that comprises one embodiment of a transport system that operates to create and transport multimedia content flows across data networks. For example, the transport system is suitable for use in transporting content clips from a content provider network to a wireless access network for broadcast distribution.

The network 100 comprises a content provider 102, a content provider network 104, an optimized broadcast network 106, and a wireless access network 108. The network 100 also includes devices 110 that comprise a mobile telephone 112, a personal digital assistance (PDA) 114, and a notebook computer 116. The devices 110 illustrate just some of the devices that are suitable for use in one or more embodiments of the transport system. It should be noted that although three devices are shown in FIG. 1, virtually any number of devices, or types of devices are suitable for used in the transport system.

The content provider 102 operates to provide content for distribution to users in the network 100. The content comprises video, audio, multimedia content, clips, real-time and non real-time content, scripts, programs, data or any other type of suitable content. The content provider 102 provides the content to the content provider network 104 for distribution. For example the content provider 102 communicates with the content provider network 104 via the communication link 118, which comprises any suitable type of wired and/or wireless communication link.

The content provider network 104 comprises any combination of wired and wireless networks that operate to distribute content for delivery to users. The content provider network 104 communicates with the optimized broadcast network 106 via the link 120. The link 120 comprises any suitable type of wired and/or wireless communication link. The optimized broadcast network 106 comprises any combination of wired and wireless networks that are designed to broadcast high quality content. For example, the optimized broadcast network 106 may be a specialized proprietary network that has been optimized to deliver high quality content to selected devices over a plurality of optimized communication channels.

In one or more embodiments, the transport system operates to deliver content from the content provider network 104 for distribution over non-specialized networks, such as the wireless access network 108. The transport system comprises a content server (CS) 122 at the content provider network 104 that operates to communicate with a broadcast base station (BBS) 124 at the wireless access network. The CS 122 and the BBS 124 communicate using one or more embodiments of a transport interface 126 that allows the content provider network 104 to deliver content in the form of content flows to the wireless access network 108 for broadcast/multicast to the devices 110. The transport interface 126 comprises a control interface 128 and a bearer channel 130. The control interface 128 operates to allow the CS 122 to add, change, cancel, or otherwise modify contents flows that flow from the content provider network 104 to the wireless access network 108. The bearer channel 130 operates to transport the content flows from the content provider network 104 to the wireless access network 108.

In one embodiment, the CS 122 uses the transport interface 126 to schedule a content flow to be transmitted to the BBS 124 for broadcast/multicast over the wireless access network 108. For example, the content flow may comprise a non real-time content clip that was provided by the content provider 102 for distribution using the content provider network 104. In one embodiment, the CS 122 operates to negotiate with the BBS 124 to determine one or more parameters associated with the content clip. Once the BBS 124 receives the content clip, it broadcasts/multicasts the content clip over the wireless access network 108 for reception by one or more of the devices 110. Any of the devices 110 may be authorized to receive the content clip and cache it for later viewing by the device user.

For example the device 110 comprises a client program 132 that operates to provide a program guide that displays a listing of content that is scheduled for broadcast over the wireless access network 108. The device user may then select to receive any particular content for rendering in real-time or to be stored in a cache 134 for later viewing. For example the content clip may be scheduled for broadcast during the evening hours, and the device 112 operates to receive the broadcast and cache the content clip in the cache 134 so that the device user may view the clip the next day. Typically, the content is broadcast as part of a subscription service and the receiving device may need to provide a key or otherwise authenticate itself to receive the broadcast.

In one or more embodiments, the transport system allows the CS 122 to add, change, modify, or delete flows that are provided over the bearer channel 122 to the BBS 124. In another embodiment, the transport system allows the CS 122 to obtain statistical information about the distribution of content flows provided by the wireless access network 108. As a result, the transport system operates to allow scheduled content flows to be transmitted from the provider network 104 to the wireless access network 108 for broadcast to the devices 110. The system also provides a way for statistical information regarding the broadcast of the content flows to be returned to the CS 122.

Figure 2:
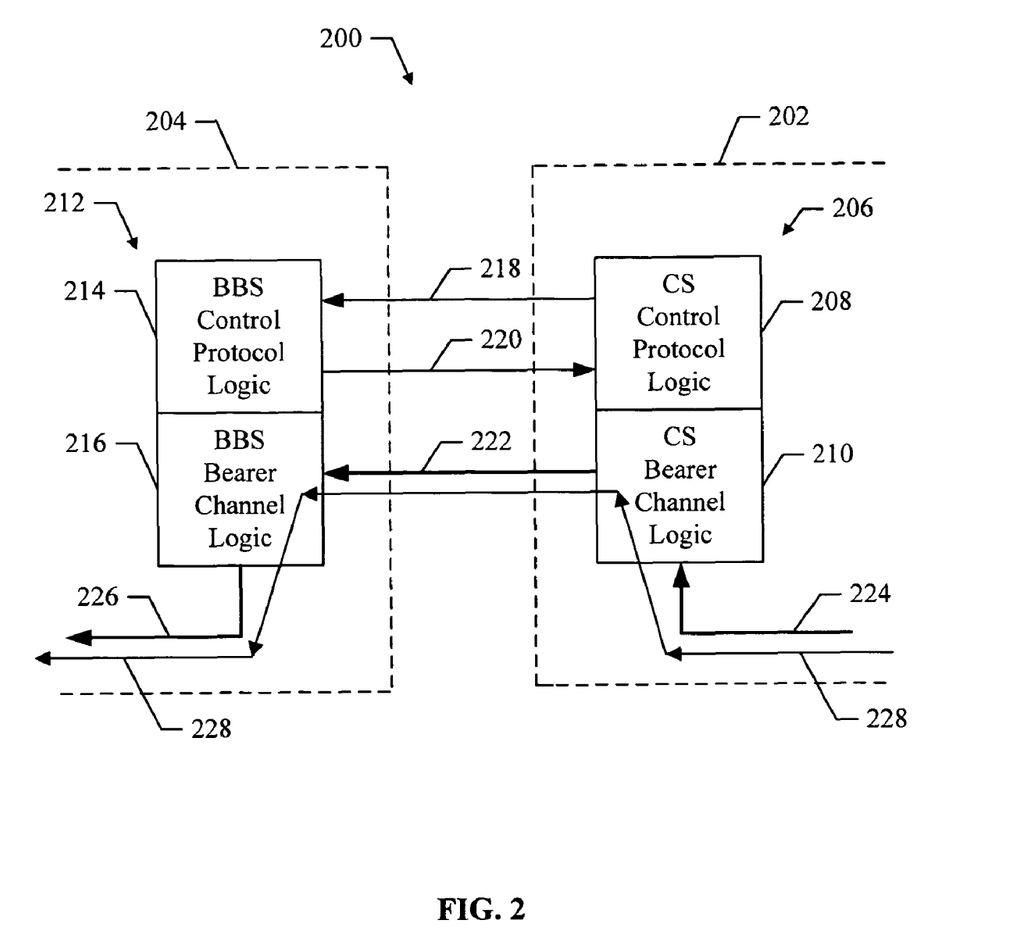
FIG. 2 shows a detailed diagram of one embodiment of a transport system that operates to create and transport multimedia content flows across data networks.

FIG. 2 shows a detailed diagram of one embodiment of a transport system 200 that operates to create and transport multimedia content flows across data networks. For example, the system 200 may be used as the transport system described in FIG. 1.

One embodiment of the transport system 200 allows a content provider network 202 to transport content flows to a wireless access network 204. The content provider network 202 includes a CS 206 that comprises CS control protocol logic 208 and CS bearer channel logic 210. The wireless access network 204 includes a BBS 212 that comprises BBS control protocol logic 214 and BBS bearer channel logic 216.

The CS control protocol logic 208 communicates with the BBS control protocol logic 214 via a control interface that comprises a request channel 218 and a response channel 220. The request channel 218 allows the CS control protocol logic 208 to send request messages to the BBS control protocol logic 214 that request to add, change, or delete content flows, or request statistical information. The response channel 220 allows the BBS protocol logic 214 to send response messages to the CS control protocol logic 208 that respond to any of the request messages. In one embodiment, the request channel 218 and the response channel 220 are comprised of any suitable type of communication links and the CS control protocol logic 208 and the BBS control protocol logic 214 comprises any suitable transmitting and receiving logic to allow messages to be exchanged using the request channel 218 and the response channel 220.

The CS bearer channel logic 210 operates to transmit content flows from the provider content network 202 to the wireless access network 204 under the control of the CS control protocol logic 208. For example, the CS bearer channel logic 210 receives a content flow 228 at its input 224 from the provider content network 202. After the CS control protocol logic 208 gets authorization to add the content flow 228 to the wireless access network 204, the CS bearer channel logic 210 operates to transmit the content flow 228 over the bearer channel 222 to the BBS bearer channel logic 216, which in turn broadcasts the content flow 228 over its output channel 226 to devices coupled to the wireless access network 204.

In one embodiment, the bearer channel 222 utilizes a generic routing encapsulation (GRE) protocol to transmit flows from the CS 206 to the BBS 212. For example, the CS bearer protocol logic 210 and the BBS bearer protocol logic 216 comprise any suitable logic to implement the bearer channel 222 using the GRE protocol. However, in other embodiments, the bearer channel 222 may utilize any suitable transmission protocol.

In one embodiment, the CS 206 and BBS 212 comprise a CPU, processor, gate array, hardware logic, memory elements, virtual machine, software, and/or any combination of hardware and software. Thus, the CA 206 and BBS 212 generally comprise logic to execute machine-readable instructions to perform the functions described herein. It should be noted that the CS 206 and the BBS 212 shown in FIG. 2 represent just one implementation and that other implementations are possible within the scope of the embodiments.

In one embodiment, the transport system comprises program instructions stored on a computer-readable media, which when executed by a processing logic in a device, for instance, the CS 206 or the BBS 212, provide the functions of the transport system described herein. For example, instructions may be loaded into the CS 206 and/or the BBS 212 from a computer-readable media, such as a floppy disk, CDROM, memory card, FLASH memory device, RAM, ROM, or any other type of memory device or computer-readable media. In another embodiment, the instructions may be downloaded into the CS 206 and/or the BBS 212 from an external device or network resource that interfaces to the CS 206 or the BBS 212. The instructions, when executed by the processing logic at the CS 206 or the BBS 212, provide one or more embodiments of a transport system as described herein.

Figure 3:
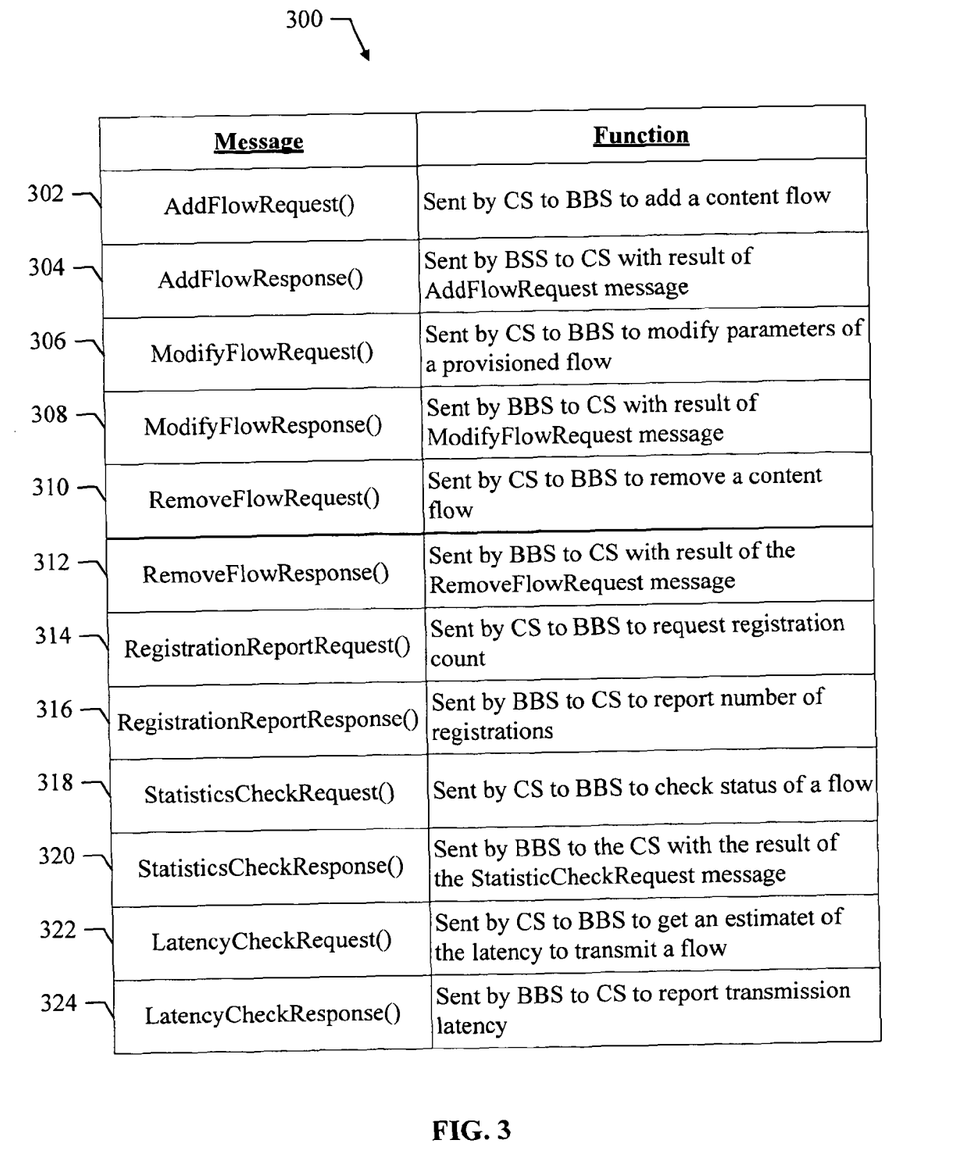
FIG. 3 shows one embodiment of transport messages used in one or more embodiments of a transport system.

FIG. 3 shows one embodiment of transport messages 300 used in one or more embodiments of a transport system. For example, the transport messages 300 may be used in the transport system 200 shown in FIG. 2. In one or more embodiments, the transport messages 300 are transmitted between the CS control protocol logic 208 and the BBS control protocol logic 214 (i.e., via links 218, 220) to allow the CS control protocol logic 208 to add, change, or delete content flows provided to the wireless access network 204. In another embodiment, the transport messages 300 allow the CS 206 to obtain statistical information about flows in the wireless access network 204.

In one embodiment, one or more of the transport messages 300 comprise parameters that are associated with any particular message. For example, the AddFlowRequest message 302 comprises one or more parameters to indicate a proposed delivery time, rate, QoS, start time, end time, or any other parameter associated with the referenced flow. Any of the messages 300 may be used to convey one or more message parameters to allow information to pass between the CS control protocol logic 208 and the BBS control protocol logic 214. It should be noted that the transport messages 300 illustrate just one implementation and that other messages and message types are possible for use within the scope of the embodiments.

The transport messages 300 comprise messages 302 through 312 that operate to add, modify, and remove a flow from the wireless access network 204. For example, the message 302 contains flow parameters and operates to request that a content flow be added to the wireless access network. The message 306 operates to modify a particular content flow that is identified in the message, for example, by modifying its start or end time. The message 310 operates to remove a particular content flow identified in the message, which may be either a flow scheduled for delivery or a flow currently being delivered.

The messages 314 through 324 operate to obtain registration, statistics, and latency information about flows in the wireless access network 204 that are identified in the respect message. For example, the message 314 operates to request a determination of how many devices are registered to receive a particular content flow identified in the message. The message 316 operates to provide a report that indicates the number of registered devices. The message 318 operates to request any type of statistics about a flow identified in the message, and the message 322 operates to request a latency time about a flow identified in the message. Thus, in one or more embodiments, the messages 300 operates to process content flows transmitted from the content provider network 202 to the wireless access network 204, and also to allow status information about those flows to be returned from the wireless access network 204 to the content provider network 202.

Figure 4:
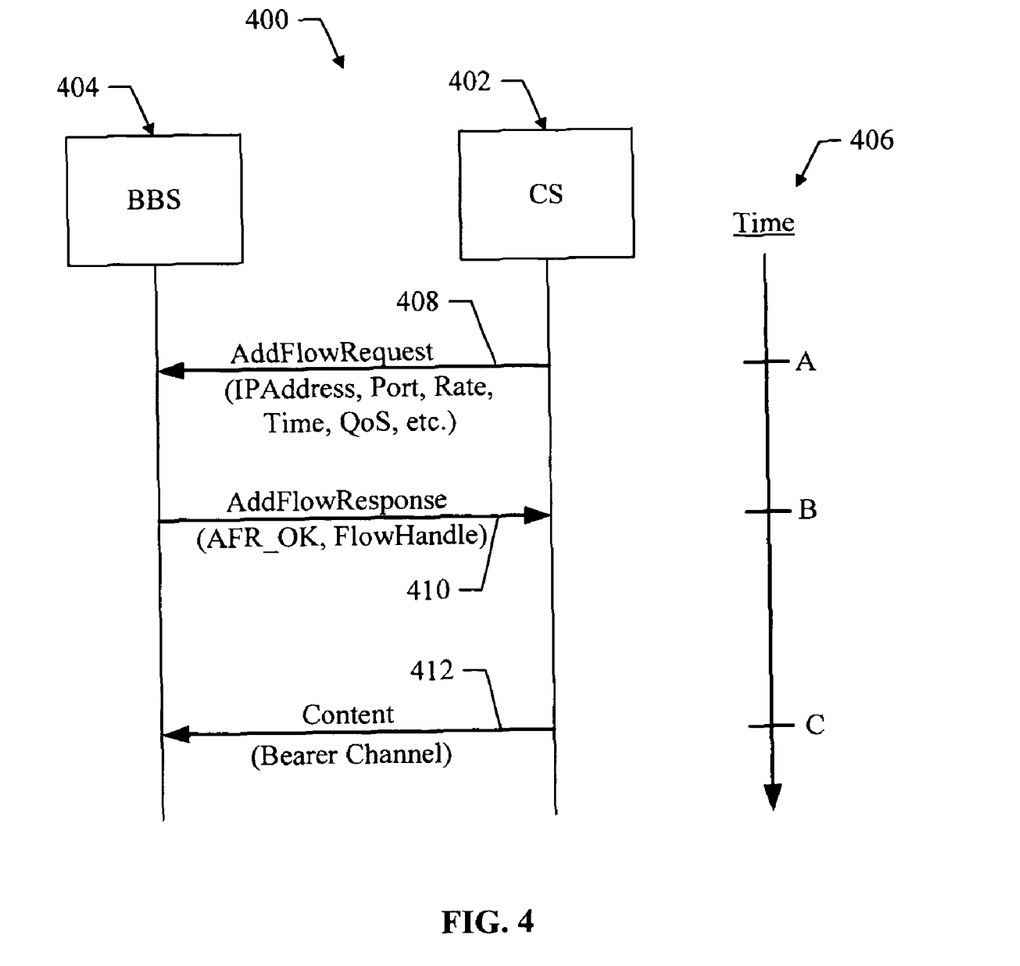
FIG. 4 shows one embodiment of a messaging protocol for use in one or more embodiment of a transport system.

FIG. 4 shows one embodiment of a messaging protocol 400 for use in one or more embodiment of a transport system. For example the messaging protocol 400 may be used to transmit the messages 300 between a CS 402 and a BBS 404. A time indicator 406 is provided which indicates a relative time for each message.

At time A, an add flow request message 302 is transmitted, as shown at 408, from the CS 402 to the BBS 404. The add flow request message 302 is a request to add a flow to the wireless access network, and the request includes flow parameters such as a flow address (IPAddress), a flow port (Port), a flow rate (Rate), a scheduled delivery time (Time), quality of service (QoS) level, and/or any other suitable flow parameters that may be used to describe the flow that the CS 402 would like to add to the wireless access network. The QoS may include information such as bandwidth, delay, jitter, etc.

At time B, which may be a relatively short time after time A, the BBS 404 responds with an add flow response message 304, as shown at 410, that indicates whether or not the flow may be added. For example, if the rate and/or QoS are acceptable to the wireless access network, the flow will be accepted. Otherwise the flow may be rejected. It will be assumed that the response message 410 indicates that the flow can be added and provides a flow handle (FlowHandle) to identify the flow in the wireless access network. The response message may include information such as the number, characteristics, and other information of the devices registered to receive content flow.

At time C, which corresponds to the time (Time) indicated in the add flow request 302, the content flow is transmitted from the CS 402 to the BBS 404 via the bearer channel as shown at 412. For example, the bearer channel may be the bearer channel 222 shown in FIG. 2. Thus, in one or more embodiments, the messaging protocol 400 may be used to exchange one or more of the transport messages 300 between the CS 402 and the BBS 404.

Figure 5:
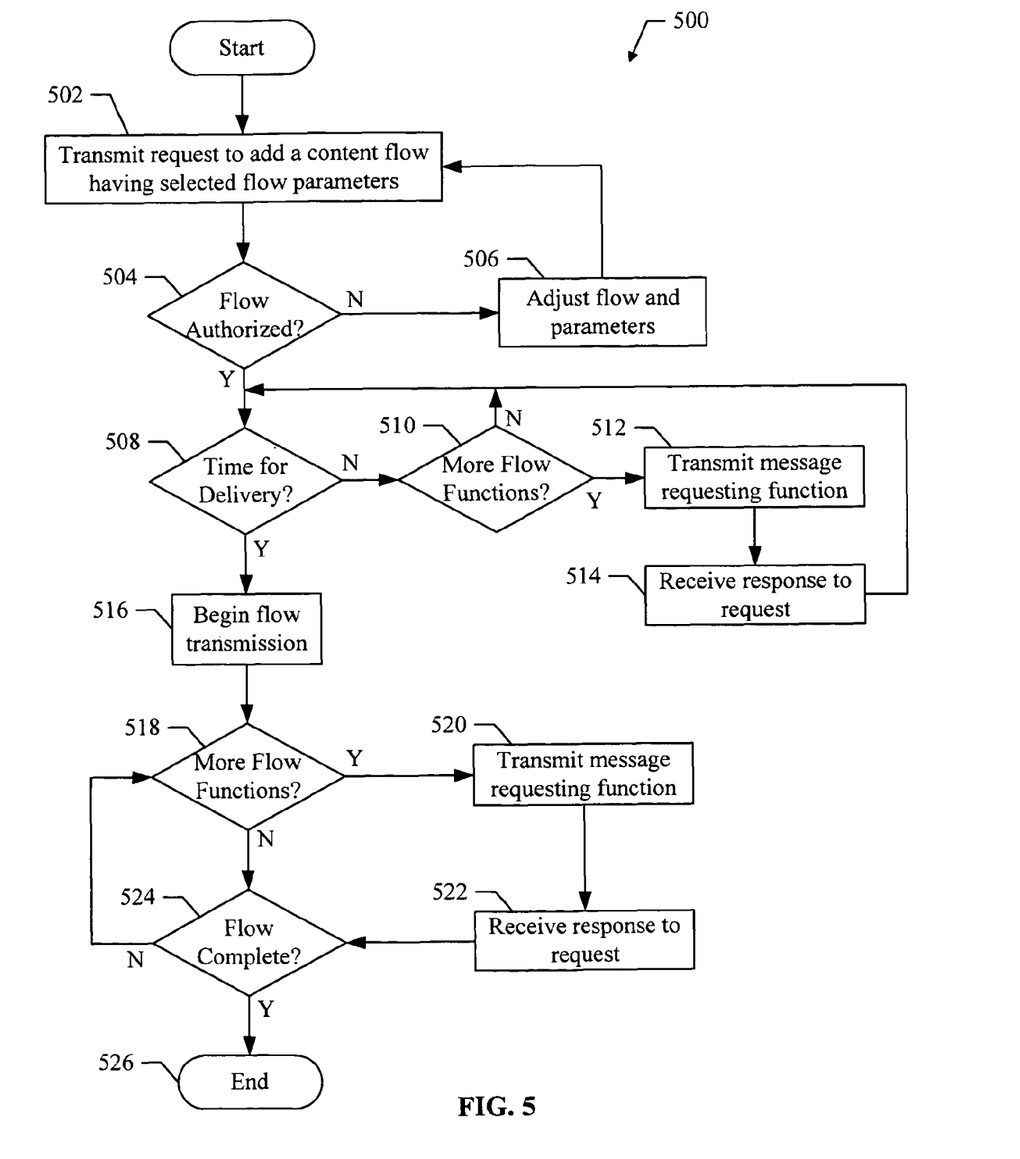
FIG. 5 shows one embodiment of a method for operating a content server in one embodiment of a transport system.

FIG. 5 shows one embodiment of a method 500 for operating a CS in one embodiment of a transport system. For clarity, the method 500 will be described with reference to the CS 206 shown in FIG. 2. In one or more embodiments, the CS control protocol logic 208 executes program instructions and controls the operation of the server CS 206 to perform the functions described below.

At block 502, a request is transmitted that requests to add a content flow to a wireless access network. For example the request is an AddFlowRequest message 302 transmitted to a BBS associated with the wireless access network. The request includes flow parameters that describe the flow (i.e., rate, QoS, etc.) and indicate a scheduled time that the flow is to be added to the wireless network. For example, the CS control protocol logic 208 transmits the request over the request channel 218 to the BBS control protocol logic 214.

At block 504, a response is received that indicates whether or not the flow will be added to the wireless access network. For example, the response is an AddFlowResponse message 304 received by the CS control protocol logic 208. In one embodiment, the wireless access network determines if the flow can be broadcast given the stated flow parameters. For example, if the flow parameters indicate a very high data rate, the wireless access network may not be able to broadcast the flow. Similarly, the flow parameters may indicate any other criteria that may not be supported by the wireless access network, (i.e., scheduled time, QoS, etc.). If the request is granted, the method proceeds to block 508.

If the request is not granted, the response message may also provide one or more acceptable parameters. For example, the AddFlowResponse message 304 indicates that the flow will not be added to the wireless network, however, in one embodiment, the response message comprises one or more acceptable parameters that may be used to obtain flow acceptance. For example, an acceptable rate or QoS parameter may be provided in the response message. The method proceeds to block 506.

At block 506, the flow and/or its associated parameters are adjusted so that it may be transmitted on the wireless access network. For example, the flow rate, QoS, scheduled transmission time, or any other parameter of the flow may be adjusted so that the flow may be broadcast by the wireless network. For example, the flow data rate may be adjusted to a data rate that can be supported by the wireless access network. In one embodiment, the CS control protocol logic 208 operates to adjust the flow and/or flow parameters based on acceptable parameters provided in the response message. The method then proceeds to block 502 where a new AddFlowRequest message 302 is transmitted and includes the new or adjusted flow parameters.

It should be noted that the block 502, 504, and 506 operate to allow the CS to negotiate one or more parameters associated with the flow. For example, if the wireless network refuses to accept the flow at a given rate, the CS may adjust the rate at block 506 based on acceptable parameters in the response message, and a new request to add the flow at the new rate is transmitted at block 502. Thus, any of the parameters associated with the flow, such as the scheduled transmission time, data rate, QoS parameters, start time, or end time may be negotiated until parameters are determined that are acceptable to the wireless access network.

At block 508, assuming the add flow request is successful, a test is performed to determine if it is time to deliver the flow to the wireless access network. For example, the CS control protocol logic 208 operates to determine if the scheduled time for flow transmission has occurred. If the schedule time for flow transmission has occurred, the method proceeds to block 516. If the scheduled time for flow transmission has not occurred, the method proceeds to block 510.

At block 510, a test is performed to determine if any flow functions need to be performed. For example the flow start or end time may need to be adjusted, or the flow may be deleted. In one embodiment, the CS control protocol logic 208 operates to determine if another flow function needs to be performed. If there are no flow functions that need to be performed, then the method proceeds to block 508 to determine if it is time to delivery the flow. If a flow function needs to be performed, then the method proceeds to block 512.

At block 512, a message is transmitted requesting a flow function be performed. For example, the message may request that the flow start or end times be adjusted, or that a flow be deleted. For example, the message may be one of the messages 300 shown in FIG. 3. In one embodiment, the CS control protocol logic 208 operates to transmit the message to the BBS control protocol logic 214 via the request channel 218.

At block 514, a response message is received indicating whether or not the function is authorized or otherwise providing a response to the function. For example, the response message may indicate that a requested change in start time for the flow is authorized. Alternatively, the response message may provide information that has been requested. For example, the response message may indicate a registration value as provided by the RegistrationReportResponse message 316. In one embodiment, the response message is receive by the CS control protocol logic 208 via the response channel 220. The method then proceeds to block 508 to determine if it is time to delivery the flow.

At block 516, a transmission of the content flow to the wireless access network at the scheduled time is started. For example, in one embodiment, the content flow is transmitted from the CS bearer channel logic 210 over the bearer channel 222 to the BBS bearer channel logic 216.

At block 518, a test is performed to determine if more flow functions need to be performed. For example, the CS control protocol logic 208 determines if more flow functions need to be performed. For example, the flow functions include changing the flow end time, deleting the flow, or other functions as described with reference to the messages 300 shown in FIG. 3. If no more flow functions are to be performed, the method proceeds to block 524. If more flow functions need to be performed, the method proceeds to block 520.

At block 520, a message is transmitted requesting a flow function be performed. For example, the message may request that the flow end time be adjusted, or that a flow be deleted. For example, the message may be one of the messages 300 shown in FIG. 3. In one embodiment, the CS control protocol logic 208 operates to transmit the message to the BBS control protocol logic 214 via the request channel 218.

At block 522, a response message is received indicating whether or not the function is authorized or otherwise provide a response to the function. For example, the response message may indicate that a requested change in the end time for the flow is authorized. Alternatively, the response message may provide information that has been requested, such as a registration value as provided by message 300 of FIG. 3. In one embodiment, the response message is receive by the CS control protocol logic 208 via the response channel 220.

At block 524, a test is performed to determine if the transmission of the flow has completed. For example, the CS control protocol logic 208 determines if the transmission has been completed. If the transmission has not completed, the method proceeds to block 518 to determine if more flow functions need to be performed. If the transmission has completed, the method ends at block 526.

It should be noted that the method 500 illustrates just one implementation and that changes, additions, deletions, or rearrangements of the described functions may be made without deviating from the scope of the described embodiments.

Figure 6:
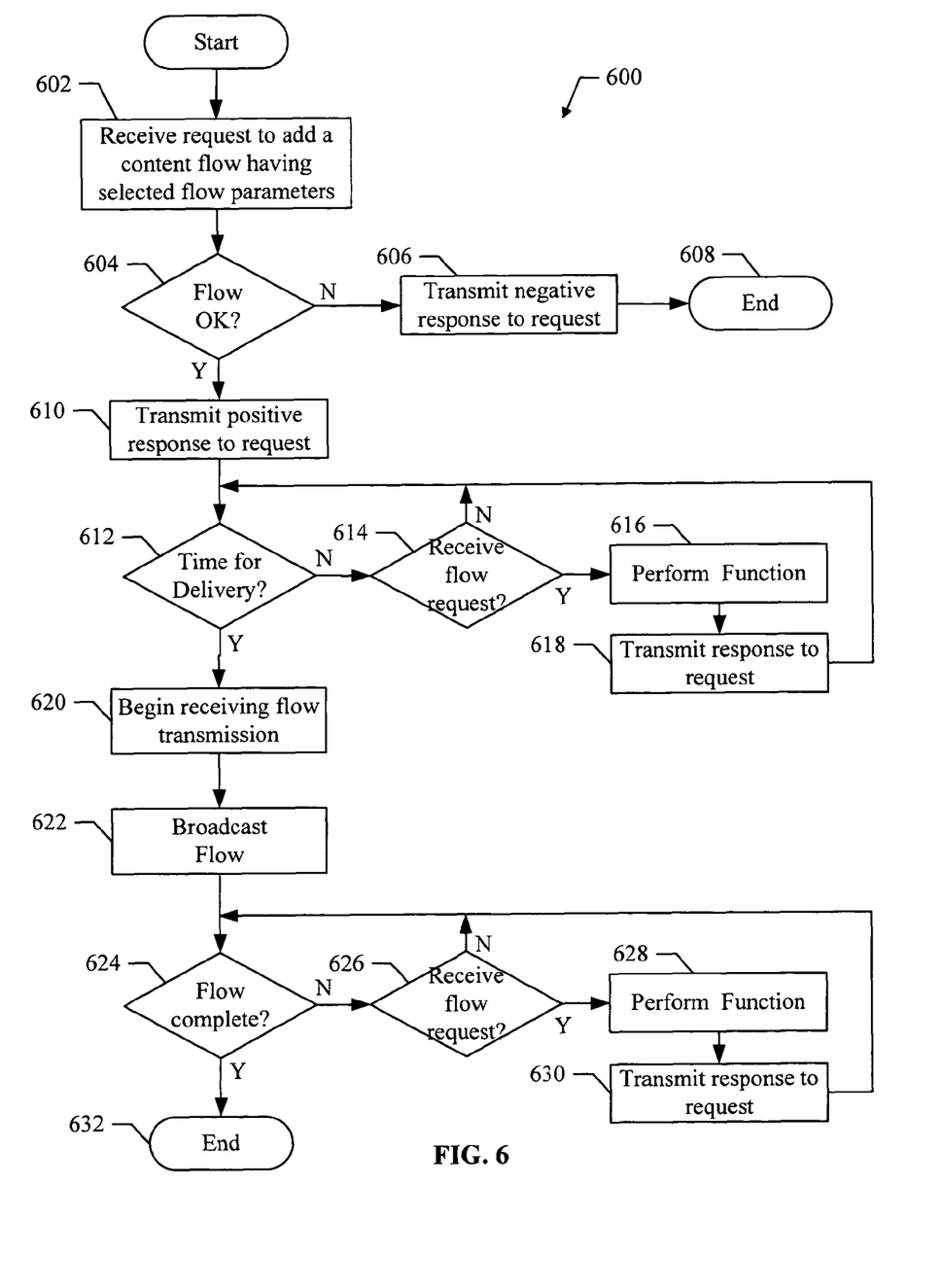
FIG. 6 shows one embodiment of a method for operating a broadcast base station in one embodiment of a transport system.

FIG. 6 shows one embodiment of a method 600 for operating a BBS in one embodiment of a transport system. For clarity, the method 600 will be described with reference to the BBS 212 shown in FIG. 2. In one or more embodiments, the BBS control protocol logic 214 executes program instructions and controls the operation of the BBS 212 to perform the functions described below.

At block 602, a request is received to add a content flow for broadcast over a wireless access network. For example, the request is an AddFlowRequest message 302 received by the BBS control protocol logic 214, and the request includes flow parameters associated with the flow that may include a rate, QoS, scheduled delivery time, etc.

At block 604, a determination is made whether or not the flow will be accepted given the stated flow parameters. For example, the BBS control protocol logic 214 operates to determine if the proposed rate or QoS of the flow is acceptable. If the propose flow and/or its parameters are acceptable, the method proceeds to block 610. If the proposed flow and/or its parameters are not acceptable, the method proceeds to block 606.

At block 606, a negative response is transmitted in response to the add flow request. For example, the BBS control protocol logic 214 operates to transmit the negative response message to the CS control protocol logic 208 via the response channel 220. In one embodiment, the negative response message is the AddFlowResponse message 304 shown in FIG. 3, which is set to include a parameter to indicate a negative response, and may also comprise one or more acceptable parameters. For example, the BBS control protocol logic 214 may determine acceptable parameters that would allow the flow to be broadcast in the wireless network. These parameters are included in the response message so that a requesting device is provided with an indication of what parameters need to be adjusted to allow the flow to be added to the wireless network. The method then ends at block 608.

At block 610, a positive response is transmitted that authorizes the content flow to be added to the wireless access network. For example, the BBS control protocol logic 214 transmits a positive response message that authorizes the content flow to be added to the wireless access network. In one embodiment, the response message is the AddFlowResponse message 304 that includes parameters indicating the positive response and transmitted to the CS control protocol logic 208 using the response channel 220. The response message includes a flow handle that identifies the flow in the wireless access network.

It should be noted that the block 602, 604, 606, and 610 operate to allow parameters associated with the flow to be negotiated between the CS and the BBS. Fore example, if the BBS 212 rejects a flow and transmits a negative response at block 606, the CS 206 may adjust the flow parameters and transmit a new add flow request that is receive at block 602. If the new flow parameters are acceptable, the BBS 212 accepts the flow and transmits a positive response at block 610. Thus, the BBS 212 and the CS 206 may operate to negotiate any flow parameter associated with the flow.

At block 612, a determination is made to determine whether or not it is time to for the scheduled flow to be received. For example, the BBS control protocol logic 214 waits for the scheduled transmission time provided in the add flow request message received at block 602. If it is time for the flow to be received, the method proceeds to block 620. If it is not time to receive the flow, the method proceeds to block 614.

At block 614, a determination is made to determine if any more flow requests have been received. For example, the BBS control protocol logic 214 operates to receive any additional flow requests from the CS control protocol logic 208, via the request channel 218. The flow requests may request to modify or delete a flow in the wireless network, or obtain status about a particular flow. If no requests are received, the method proceeds to block 612 to determine if it is time to receive the flow. If additional flow requests are received, the method proceeds to block 616.

At block 616, the received flow request is decoded and if necessary, any identified functions are performed. For example, the request is decoded to determine what flow function is to be performed. The flow function may be one of the functions described with reference to the messages 300 in FIG. 3, or any other suitable function. For example, the BBS control protocol logic 214 operates to decode the flow request, and the requested function is provided if necessary. For example, the requested function may be a statistics request (message 318) regarding a particular flow in the wireless access network. The BBS control protocol logic 214 operates to obtain the statistics and provide the statistics information to the requesting device in a response message (message 320). For example the requesting device may be the CS control protocol logic 208 and the BBS control protocol logic 214 operates to perform the requested function.

At block 618, a response is transmitted in response to the flow request. For example, the BBS control protocol logic 214 operates to assemble a response message and transmit it to the requesting device via the response channel 220. For example, the request may be a request to determine how may devices in the wireless access network are registered to receive the flow, as provided by the message 314. The BBS control protocol logic 214 operates to determine the number of registered devices and return this value in the response message 316. The method then proceeds to block 612 to determine if it is time to receive the transmitted flow.

At block 620, the BBS begins receiving the flow at the scheduled time. For example, the content flow is received over the bearer channel 222 by the BBS bearer channel logic 216.

At block 622, the content flow is broadcast over the wireless access network. For example, the BBS bearer channel logic 216 operates to broadcast the received content flow over the wireless access network for reception by one or more devices. The devices may cache the content flow for later viewing. In another embodiment, the flow may be cached by the BBS for later broadcast to the devices in the wireless access network.

At block 624, a determination is made whether or not the flow has been completely received. For example, the BBS control protocol logic 214 operates to determine if the flow has been completely received. If the flow has not been completely received, the method proceeds to block 626. If the flow has been completely receive, the method ends at block 632.

At block 626, a determination is made to determine if any more flow requests have been received. For example, the BBS control protocol logic 214 operates to receive any additional flow requests from the CS control protocol logic 208 via the request channel 218. The flow requests may request to modify or delete a flow in the wireless network, or obtain status about a particular flow. If no requests are received, the method proceeds to block 624 to determine if the flow has been completely received. If additional flow requests are received, the method proceeds to block 628.

At block 628, the received flow request is decoded and if necessary, any identified functions are performed. For example, the request is decoded to determine what flow function is to be performed. The flow function may be one of the functions described with reference to the messages 300 in FIG. 3, or any other suitable function. For example, the BBS control protocol logic 214 operates to decode the flow request, and the requested function is provided if necessary. For example, the requested function may be a statistics request regarding a particular flow in the wireless access network. The BBS control protocol logic 214 operates to obtain the statistics and provide the statistics information to the requesting device in the message 320. For example the requesting device may be the CS control protocol logic 208 and the BBS control protocol logic 214 operates to perform the requested function.

At block 630, a response is transmitted in response to the flow request. For example, the BBS control protocol logic 214 operates to assemble a response message and transmit it to the requesting device via the response channel 220. For example, the request may be a request to determine how may devices in the wireless access network are registered to receive the flow, as provided by the message 314. The BBS control protocol logic 214 operates to determine the number of registered devices and return this value in the response message 316. The method then proceeds to block 624 to determine if the flow has been completely received.

It should be noted that the method 600 illustrates just one implementation and that changes, additions, deletions, or rearrangements of the described functions may be made without deviating from the scope of the described embodiments.

Accordingly, while one or more embodiments of a transport system for the creation and transport of multimedia content flows across data networks have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

What is claimed is:

1. A method of interfacing a content server with a wireless network, the method comprising:
   transmitting a request message from the content server to the wireless network requesting the wireless network schedule delivery of a content flow across the wireless network to a plurality of devices, wherein the request message includes parameters including a scheduled delivery time;
   receiving, at the content server, a response message from the wireless network indicating whether the content flow will be delivered by the wireless network; and
   if the response message indicates that the wireless network will deliver the content flow, waiting until the scheduled delivery time and transmitting the content flow from the content server to the wireless network;
   wherein when the response message indicates that the content flow is not authorized to be added to the wireless network, the method further comprising:
   adjusting one or more parameters associated with the content flow;
   transmitting, from the content server to the wireless network, a new request message, based on the one or more adjusted parameters.

2. The method of claim 1, further comprising:
   transmitting a second request message from the content server to the wireless network, the second request message requesting a modification to the content flow.

3. The method of claim 1, further comprising:
   transmitting a second request message from the content server to the wireless network, the second request message requesting the wireless network delete the content flow.

4. The method of claim 1, further comprising:
   transmitting a second request message from the content server to the wireless network, the second request message requesting a latency time of the content flow.

5. The method of claim 1, wherein the content flow comprises a non real-time media clip.

6. The method of claim 1, wherein the content flow is transmitted over a bearer channel to the wireless network.

7. The method of claim 1, wherein the one or more parameters comprise at least one of a rate parameter and a quality of service rate parameter.

8. The method of claim 1, wherein the response message comprises information such as number of devices registered to receive the content flow.

9. The method of claim 1, further comprising negotiating one or more parameters associated with the content flow based on one or more acceptable parameters included in the response message.

10. A content server comprising:
    transmitting logic that transmits a request message to a wireless network requesting the wireless network schedule delivery of a content flow across the wireless network to a plurality of devices, wherein the request message includes at least one parameter including a scheduled delivery time;
    receiving logic that receives a response message from the wireless network indicating whether the content flow will be delivered across the wireless network;
    waiting logic that operates to wait until the scheduled delivery time; and
    a bearer channel that operates to deliver the content flow to the wireless network;
    wherein the receiving logic comprises:
    logic that operates to adjust one or more parameters associated with the content flow when the response message indicates that the content flow will not be delivered;
    logic that operates to transmit, to the wireless network, a new request message to deliver the content flow, wherein the new request message includes the one or more adjusted parameters.

11. The content server of claim 10, wherein the transmitting logic operates to transmit a second request message to modify the content flow to the wireless network.

12. The content server of claim 10, wherein the transmitting logic operates to transmit a second request message to delete the content flow to the wireless network.

13. The content server of claim 10, wherein the transmitting logic operates to transmit a second request message to the wireless network to obtain a latency time of the content flow.

14. The content server of claim 10, wherein the content flow comprises a non real-time media clip.

15. The content server of claim 10, wherein the one or more parameters comprise at least one of a rate parameter and a quality of service rate parameter.

16. The content server of claim 10, wherein the response comprises information such as number of devices registered to receive the content flow.

17. The content server of claim 10, further comprising logic that operates to negotiate one or more parameters associated with the content flow based on one or more acceptable parameters included in the response message.

18. A content server comprising:
    means for transmitting a request message to a wireless network requesting the wireless network schedule delivery of a content flow across the wireless network to a plurality of devices, wherein the request message includes at least one parameter including a scheduled delivery time;
    means for receiving a response message indicating whether the content flow will be added to the wireless network;
    means for waiting until the scheduled delivery time; and means for delivering the content flow to the wireless network;

wherein the means for receiving comprises:

means for adjusting one or more parameters associated with the content flow when the response message indicates that the wireless network will not deliver the content flow; and means for transmitting a new request message to deliver the content flow to the wireless network, wherein the new request message includes the one or more adjusted parameters.

19. The content server of claim 18, further comprising:

means for transmitting a second request message to the wireless network requesting a modification of the content flow.

20. The content server of claim 18, further comprising:

means for transmitting a second request message to the wireless network requesting deletion of the content flow.

21. The content server of claim 18, further comprising:

means for transmitting a second request message to the wireless network requesting a latency time of the content flow.

22. The content server of claim 18, wherein the content flow comprises a non real-time media clip.

23. The content server of claim 18, wherein the means for delivering comprises means for transmitting the content flow over a bearer channel to the wireless network.

24. The content server of claim 18, wherein the one or more parameters comprise at least one of a rate parameter and a quality of service rate parameter.

25. The content server of claim 18, wherein the response message comprises information such as number of devices registered to receive the content flow.

26. The content server of claim 18, further comprising means for negotiating one or more parameters associated with the content flow based on one or more acceptable parameters included in the response message.

27. A non-transitory computer-readable media comprising:

instructions for transmitting a request message from a content server to a wireless network requesting the wireless network schedule delivery of a content flow to a plurality of devices, wherein the request message includes at least one parameter including a scheduled delivery time;

instructions for receiving a response message from the wireless network indicating the wireless network will deliver the content flow; and instructions for, if the wireless network will deliver the content flow, waiting until the scheduled delivery time and transmitting the content flow to the wireless network;

wherein the instructions for receiving comprise:

instructions for adjusting one or more parameters associated with the content flow in the event the response message indicates that the wireless network will not deliver the content flow; and instructions for transmitting a new request message to add the content flow to the wireless network, wherein the new request message includes the one or more adjusted parameters.

28. The non-transitory computer-readable media of claim 27, further comprising:

instructions for transmitting a second request message to modify the content flow.

29. The computer-readable media of claim 27, further comprising:

instructions for transmitting a second request message to delete the content flow.

30. The computer-readable media of claim 27, further comprising:

instructions for transmitting a second request message to obtain a latency time of the content flow.

31. The computer-readable media of claim 27, wherein the content flow comprises a non real-time media clip.

32. The computer-readable media of claim 27, wherein the instructions for waiting and delivering comprise instructions for transmitting the content flow over a bearer channel to the wireless network.

33. The non-transitory computer-readable media of claim 27, wherein the one or more parameters comprise at least one of a rate parameter and a quality of service rate parameter.

34. The non-transitory computer-readable media of claim 27, wherein the response message comprises information such as number of devices registered to receive the content flow.

35. The non-transitory computer-readable media of claim 27, further comprising instructions for negotiating one or more parameters associated with the content flow based on one or more acceptable parameters included in the response message.

36. A method for operating a wireless network to deliver a content flow to a plurality of devices, the method comprising:

receiving a request message from a content server to schedule delivery of a content flow across the wireless network to a plurality of devices, wherein the request message includes parameters including a scheduled delivery time;

transmitting a response message to the content sever indicating whether the content flow will be added to the wireless network; and receiving the content flow at the scheduled delivery time for delivery to the devices;

wherein the act of transmitting comprises transmitting a response message indicating that the content flow will not be delivered by the wireless network, wherein the response message comprises one or more acceptable parameters.

37. The method of claim 36, further comprising:

receiving a second request message from the content server to modify the content flow; and transmitting a second response message to the content server indicating that the modification to the content flow will be accepted.

38. The method of claim 36, further comprising:

receiving a second request message from the content server to delete the content flow; and transmitting a second response message to the content server indicating that the content flow will be deleted.

39. The method of claim 36, further comprising:

receiving a second request message from the content server to obtain a latency time of the content flow; and transmitting a second response message to the content server indicating the latency time of the content flow.

40. The method of claim 36, wherein the content flow comprises a non real-time media clip.

41. The method of claim 36, wherein the content flow is received over a bearer channel.

42. The method of claim 36, further comprising multicasting or broadcasting the content flow over the wireless network.

43. A wireless network comprising:

receiving logic that operates to receive a request message from a content server, the request message requesting the wireless network schedule delivery of a content flow across the wireless network to a plurality of devices, the request message including a scheduled delivery time;

transmitting logic that operates to transmit a response message indicating whether the content flow will be added to the wireless network; and content receiving logic that operates to receive the content flow for broadcast to the devices;

wherein when the transmitting logic transmits a negative response message indicating that the content flow will not be added to the wireless network, the negative response message comprises one or more acceptable parameters.

44. The wireless network of claim 43, wherein the receiving logic operates to receive a second request message to modify the content flow, and the transmitting logic operates to transmit a second response message indicating that the modification to the content flow will be accepted.

45. The wireless network of claim 43, wherein the receiving logic operates to receive a second request message to delete the content flow, and the transmitting logic operates to transmit a second response message indicating that the content flow will be deleted.

46. The wireless network of claim 43, wherein the receiving logic operates to receive a second request message to obtain a latency time of the content flow, and the transmitting logic operates to transmit the latency time of the content flow.

47. The wireless network of claim 43, wherein the content flow comprises a non real-time media clip.

48. The wireless network of claim 43, wherein the content receiving logic operates to receive the content flow over a bearer channel.

49. The wireless network of claim 43, further comprising logic that operates to multicast or broadcast the content flow over the wireless network.

50. A wireless network comprising:

means for receiving a request message from a content server to schedule a multicast of a content flow to a plurality of devices, wherein the request message includes a scheduled delivery time;

means for transmitting a response message to the content server indicating whether the content flow will be multicast across the wireless network;

means for receiving the content flow at the scheduled delivery time; and means for multicasting the content flow to the plurality of device;

wherein the means for transmitting transmits a negative response message indicating that the content flow will not be multicast across the wireless network, wherein the negative response message comprises one or more acceptable parameters.

51. The wireless network of claim 50, further comprising: means for receiving a second request message to modify the content flow; and means for transmitting a second response message indicating that the modification to the content flow will be accepted.

52. The wireless network of claim 50, further comprising: means for receiving a second request message to delete the content flow; and means for transmitting a second response message indicating that the content flow will be deleted.

53. The wireless network of claim 50, further comprising: means for receiving a second request message to obtain a latency time of the content flow; and means for transmitting a second response message indicating the latency time of the content flow.

54. The wireless network of claim 50, wherein the content flow comprises a non real-time media clip.

55. The wireless network of claim 50, wherein the means for receiving the content flow comprises means for receiving the content flow over a bearer channel.

56. A non-transitory computer-readable media comprising instructions for operating a wireless network, the computer-readable media comprising:

instructions for receiving a request message from a content server to schedule delivery of a content flow across the wireless network to a plurality of devices, wherein the request message includes a scheduled delivery time;

instructions for transmitting a response message to the content server indicating whether the content flow will be added to the wireless network; and instructions for receiving the content flow at the scheduled delivery time for delivery to the devices;

wherein the instructions for transmitting comprise instructions for transmitting one or more acceptable parameters with a negative response message indicating that the content flow will not be delivered across the wireless network.

57. The non-transitory computer-readable media of claim 56, further comprising:

instructions for receiving a second request message to modify the content flow; and instructions for transmitting a second response message indicating whether the modification to the content flow will be accepted.

58. The non-transitory computer-readable media of claim 56, further comprising:

instructions for receiving a second request message to delete the content flow; and instructions for transmitting a second response message indicating whether the content flow will be deleted.

59. The non-transitory computer-readable media of claim 56, further comprising:

instructions for receiving a second request message to obtain a latency time of the content flow; and instructions for transmitting a second response message indicating the latency time of the content flow.

60. The non-transitory computer-readable media of claim 56, wherein the content flow comprises a non real-time media clip.

61. The non-transitory computer-readable media of claim 56, wherein the instructions for receiving the content flow comprise instructions for receiving the content flow over a bearer channel.

62. The non-transitory computer-readable media of claim 56, further comprising instructions for broadcasting or multicasting the content flow over the wireless network.

* * * * *

UNITED STATES PATENT AND TRADEMARK OFFICE
CERTIFICATE OF CORRECTION

PATENT NO.        : 7,912,457 B2                                    Page 1 of 1
APPLICATION NO.   : 11/111050
DATED             : March 22, 2011
INVENTOR(S)       : Chandhok et al.

It is certified that error appears in the above-identified patent and that said Letters Patent is hereby corrected as shown below:

Column 17, line 47, claim 50: "device" to read as --devices--

Signed and Sealed this
Twenty-ninth Day of November, 2011

David J. Kappos
*Director of the United States Patent and Trademark Office*